July 8, 1930.  J. M. DIMAND  1,769,917
REFLECTION PARKING LIGHT
Original Filed Nov. 3, 1927
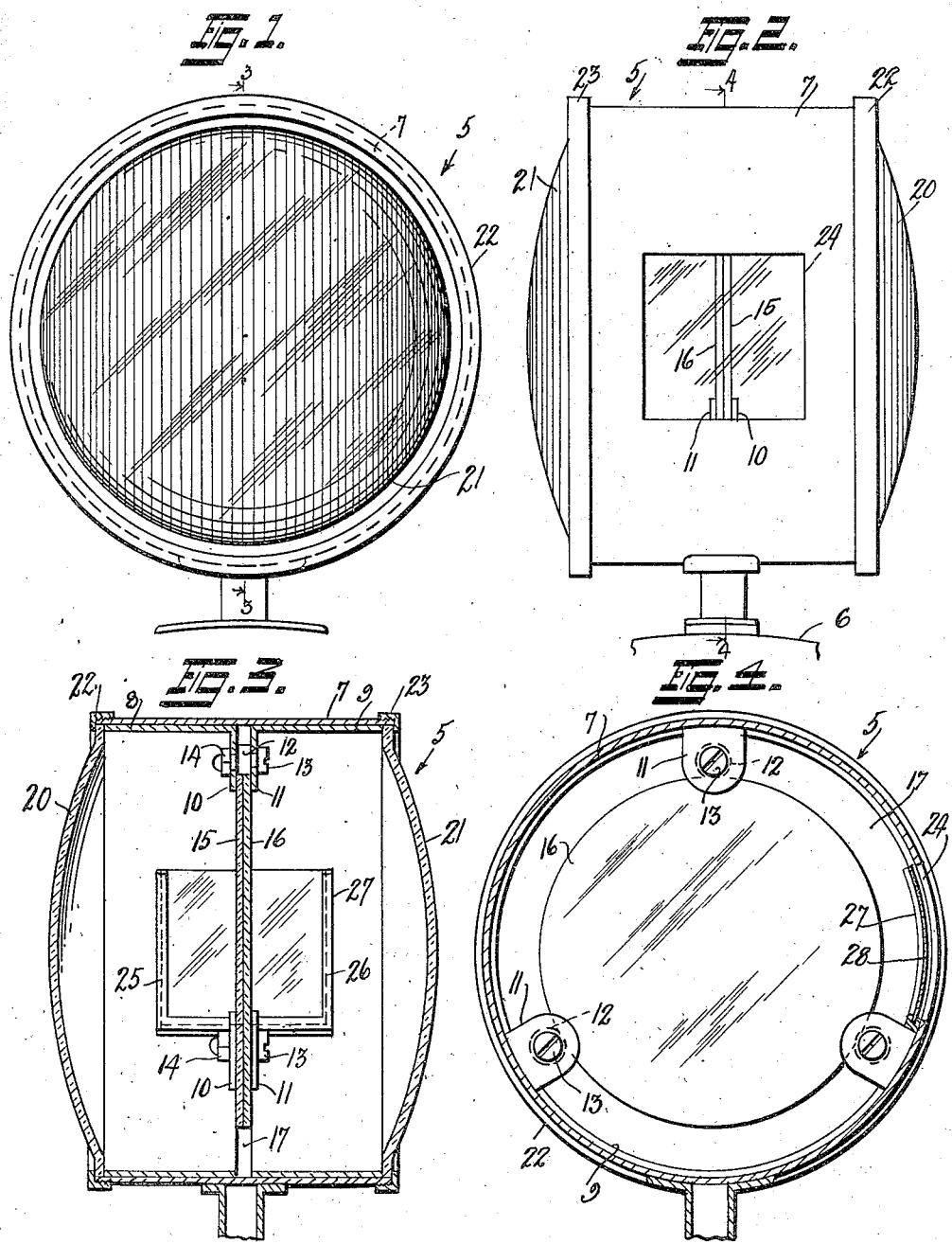
INVENTOR
Jacob M. Dimand
BY
Maurice Block
ATTORNEY Patented July 8, 1930

1,769,917

UNITED STATES PATENT OFFICE

JACOB M. DIMAND, OF BROOKLYN, NEW YORK

REFLECTION PARKING LIGHT

Application filed November 3, 1927, Serial No. 230,709. Renewed May 19, 1930.

This invention relates to improvements in vehicle parking lights and has for one of its important objects, the provision of a device adapted to receive rays of light from an outside source and reflect same through a colored lens within the device itself.

Another object of the invention is to provide a device of this character with reflectors at the interior thereof to reflect such rays of light through lenses at the front and rear thereof.

A further object of the invention is to provide a device of this character with reflectors of a diameter less than the diameter of the casing, and with a transparent panel or section at one side of the casing to admit rays of light therethrough to pass through the space formed between the casing and reflectors and to reflect same through the lenses.

Other important objects and novel features of the invention will become more apparent as the specification proceeds.

In the drawings forming a part of this specification:

Figure 1 is an end view in elevation of my improved parking light,

Fig. 2 is a side view thereof,

Fig. 3 is a sectional view taken on line 3—3 Fig. 1, and

Fig. 4 is a sectional view taken on line 4—4 Fig. 2.

Referring to the drawings in detail in which like numerals refer to the same parts throughout the several views, 5 indicates a reflection parking light adapted to be secured to any portion of an automobile (not shown), preferably to one of the mudguards 6.

The device comprises a casing 7 preferably made of metal and adapted to receive therein spacing rings 8 and 9 provided with ears 10 and 11 respectively. Spacing washers 12 between the said ears are maintained in place by screws 13 and nuts 14 and provide means for supporting reflectors or mirrors 15 and 16. These mirrors, as will be seen by referring to Figs. 3 and 4, are of a smaller diameter than the inside diameter of the casing 7, thus providing an annular space or opening 17 through which rays of light may pass from one side of the device to the opposite side thereof and illuminate the respective lenses 20 and 21 made of different colored glass, preferably red and green respectively. These lenses abut the spacing rings 8 and 9 and are maintained in position by flanged rings 22 and 23 screwed or otherwise secured to opposite sides of the casing 7. The casing 7 may be provided at one or both sides thereof with an opening 24 and the rings 8 and 9 have cutaway portions 25 and 26 in alinement with the said opening 24. A frame 27 is secured to the rings 8 and 9 which provides means for holding a section of transparent material 28 through which rays of light coming at an angle to the side of the car may enter to illuminate the reflectors and the lenses 20 and 21.

It will be clearly seen that with my improved parking device the usual tail lights may be dispensed with, and that a parked car will be visible from all direction, as the reflectors 15 and 16 respectively will reflect the rays from the head lights of machines coming from the front, or rear and any light entering the device through the sides will illuminate the lenses thereof. The rays from the headlights of a car coming from the rear will enter through the lens 20 which is red and be reflected by the mirror 15 to warn the driver of the said oncoming car and simultaneously some of the light will illuminate the reflector 16 and the lens 21 which may be colored green and apprise the occupants of the parked car, if there be any, of the advancing car. Likewise a car coming from the front or at an angle to the side of the parked car with its headlights on, will light up the parking device and rays from the headlights of the said oncoming cars will be reflected by the device.

From the above it will be seen that I have provided a parking light that will reflect in more than one direction, the rays of light from the headlights of cars coming from the front, rear or side of a parked car and thus do away with the necessity of providing tail lights directly connected to the lighting system of the car.

Having described my invention, what I claim as new and desire to secure by Letters Patent, is:

1. A device of the nature described comprising a casing adapted to be secured to a vehicle, a plurality of reflectors disposed back to back within the casing spaced from the interior walls thereof, the said reflectors forming a pair of compartments within the casing, and a lens in line with each of the reflectors, to admit light from an outside source to simultaneously illuminate both compartments and be reflected by one of the reflectors.

2. A device of the nature described comprising a casing adapted to be secured to a vehicle, a plurality of reflectors disposed back to back within the casing spaced from the interior walls thereof, a lens in line with each of the reflectors, a section of transparent material supported on the device in line with an opening in the side of the casing, to admit light therethrough from an outside source to be reflected by either one of the reflectors through its respective lens.

In testimony whereof I hereunto affix my signature.

JACOB M. DIMAND.